Figure 1:
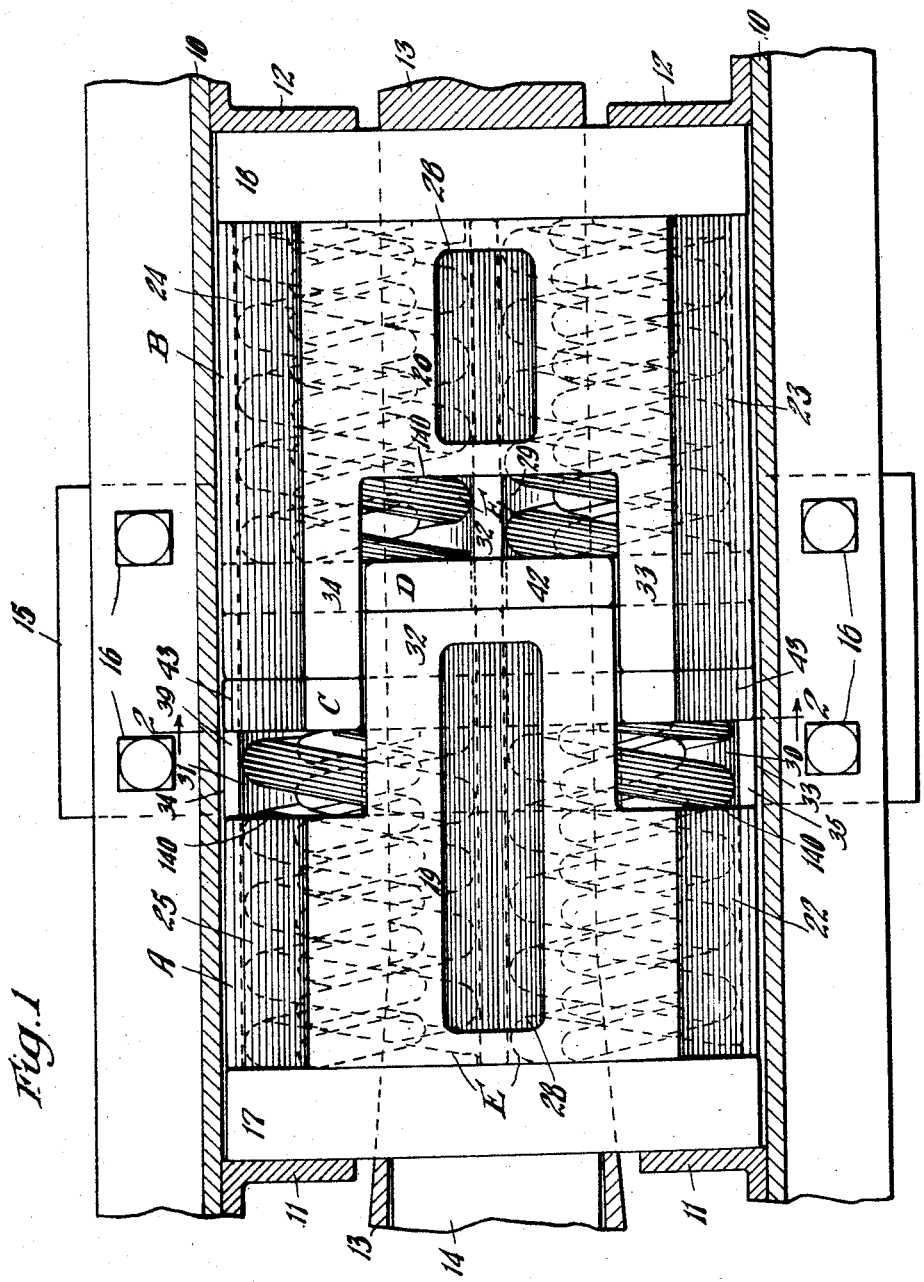

Sept. 1, 1925. 1,551,674
H. J. LOUNSBURY
SHOCK ABSORBING MECHANISM
Filed Aug. 9, 1924 2 Sheets-Sheet 1

Witnesses
Wm. Geiger

Inventor
Harvey J. Lounsbury
By George I. Haight
His Atty.

Sept. 1, 1925.                                                    1,551,674
                        H. J. LOUNSBURY
                   SHOCK ABSORBING MECHANISM
                      Filed Aug. 9, 1924                2 Sheets-Sheet 2
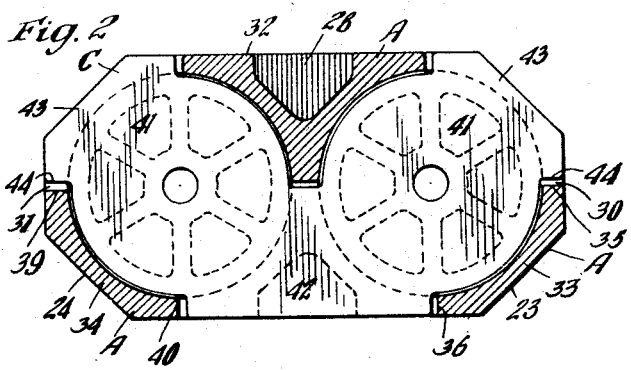
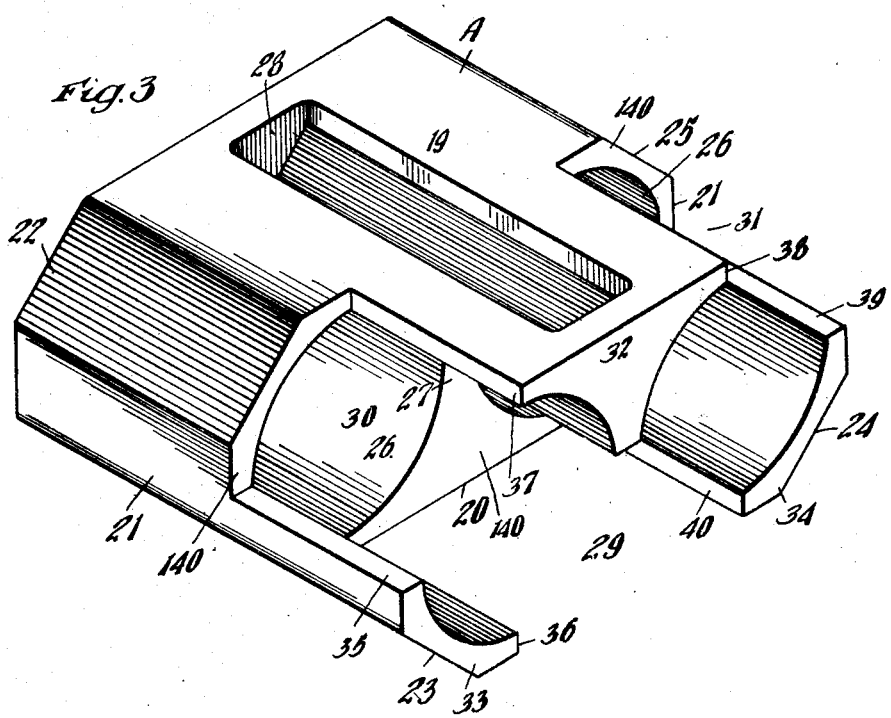
Witnesses
Wm. Geiger
Inventor
Harvey J. Lounsbury
By George D. Haight
His Atty.

Patented Sept. 1, 1925.

1,551,674

UNITED STATES PATENT OFFICE.

HARVEY J. LOUNSBURY, OF GLEN ELLYN, ILLINOIS, ASSIGNOR, BY MESNE ASSIGNMENTS, TO W. H. MINER, INC., A CORPORATION OF DELAWARE.

SHOCK-ABSORBING MECHANISM.

Application filed August 9, 1924. Serial No. 731,051.

To all whom it may concern:

Be it known that I, HARVEY J. LOUNSBURY, a citizen of the United States, residing at Chicago, in the county of Cook and State of Illinois, have invented a certain new and useful Improvement in Shock-Absorbing Mechanisms, of which the following is a full, clear, concise and exact description, reference being had to the accompanying drawings forming a part of this specification.

This invention relates to improvements in shock absorbing mechanisms.

In the manufacture and operation of many railroad cars, stop lugs for front and rear main followers only are provided, this practice being now substantially standard in the United States. Such an arrangement of stop lugs, while particularly adapted for a friction shock absorbing mechanism, is not adapted for a single spring shock absorbing device, because of lack of capacity, nor is such an arrangement adaptable to the use of the usual tandem spring arrangement employing a tandem yoke with the usual intermediate thimble and intermediate followers. Certain railroads prefer to use spring shock absorbing mechanisms as distinguished from friction shock absorbing mechanisms and one object of my invention, therefore, is to provide a spring shock absorbing mechanism which may be used with a yoke having a single pocket only in conjunction with an arrangement of stop lugs as hereinbefore described and wherein also is obtained sufficient shock absorbing capacity to meet present day conditions.

Another and more specific object of my invention is to provide a twin tandem spring shock absorbing mechanism of relatively high capacity; of extremely rugged and substantial construction; comprised of a minimum number of parts and wherein all of the parts of the mechanism proper, other than the springs, can be economically manufactured as ordinary foundry castings.

A still further object of my invention is to provide a twin tandem shock absorbing mechanism, utilizable in conjunction with a single pocket yoke, wherein the casings which retain the shock absorbing units and which also transmit the load, are partially telescoped and operate intermediate followers for effecting the tandem action, the telescoping portions of the casings being so formed as to uniformly distribute applied pressure to the intermediate followers in such manner as to eliminate any tendency of the intermediate followers to be tilted or cocked from their proper vertical operating plane.

In the drawings forming a part of this specification, Figure 1 is a horizontal, longitudinal, sectional view of a portion of a railway draft rigging showing my improvements in connection therewith. Figure 2 is a vertical, transverse, sectional view of the shock absorbing mechanism proper and corresponding to the section line 2—2 of Figure 1. And Figure 3 is a detailed perspective of one of the two casings employed in my improved construction.

In said drawings, 10—10 indicate the draft sills of the car underframe, which draft sills may be of any desired or suitable construction. To the inner faces of these draft sills are secured front stop lugs 11—11 of any suitable construction and corresponding rear stop lugs 12—12. The shock absorbing mechanism proper is disposed between the front and rear sets of stop lugs and is contained within the pocket of a single pocket yoke 13, the latter being suitably connected to a drawbar, a portion of which is indicated at 14. The yoke and parts therewithin are supported in operative position by a saddle plate 15, detachably secured to the lower flanges of the draft sills 10, as by bolts 16.

In the embodiment of my invention, illustrated in the drawings, the front and rear main followers 17 and 18 are made separate from the two main casings A and B, said followers 17 and 18 comprising heavy, flat rectangular plates engaging the front and rear sets of stop lugs, respectively. Two casings A and B are employed; front and rear intermediate followers C and D; a twin arranged front set of springs E; and a rear set of twin arranged springs F.

The two casings A and B are preferably of like construction and a detailed description of one of them will suffice. Each of said casings as shown, comprises top and bottom horizontally extending walls 19 and 20; vertical side walls 21—21; and diagonally disposed corner walls 22, 23, 24 and 25. With this construction, each casing A and B presents a horizontally elongated, octagonal outline in end elevation. Each casing A and B is open at its end which is placed in contact with the corresponding main follower 17 or 18 and is provided with a pair of longitudinally extending, cylindrical openings 26—26, extending parallelly side by side, said openings or pockets being separated by a partition 27 formed integrally with the casing. Each casing is suitably cored on its top and bottom faces, centrally thereof, as indicated at 28, to lessen the amount of metal required.

At its inner end, that is, the end remote from the main follower with which it engages, each casing is cut away or recessed. Considering the casing A in the position shown in Figure 3, the casing has a portion of its bottom wall 20 cut away so as to leave a rectangular opening or recess 29 and also, the central partition 27 will be cut away or omitted for one-half of its height. Similarly, at the two corners remote from the opening 29, portions of the two corner walls 22 and 25, and of the upper wall 19 and of the side walls 21 are omitted, leaving corner opening or recesses 30 and 31.

With the casings A and B each made as above described, it is evident that three longitudinally extending arms are left at the inner end of each casing, there being one central arm 32 and two opposite corner arms 33 and 34. Each of the arms is obviously left with opposed arcuate surfaces which are continuations of the surfaces of the pockets 26. Furthermore, it will be noted that each of the arms 32, 33 and 34 is left with longitudinally extending edges 35, 36, 37, 38, 39 and 40, the edges 35 and 37, and 38 and 39, being at right angles to each other and the edges 36 and 40 being parallel to each other. At the inner ends of each of the openings or recesses 29, 30 and 31 are provided flat, transversely extending limiting stop shoulders 140—140 for the purpose hereinafter described.

The two intermediate followers C and D are of like construction. Each of said intermediate followers, as best seen in Figure 2, comprises two circular sections 41—41 in horizontal alinement and united by an intermediate more or less triangular section 42. At each upper corner, as the intermediate follower is viewed in Figure 2, extensions 43—43 are formed to the circular sections 41. The extensions 43 and the triangular section 42 are so formed as to provide edges 44—44 disposed opposite the edges 35 to 40 inclusive of the casing, it being apparent from an inspection of Figure 2 that the triangular section of the intermediate follower fits and slides within the recess 29 of one casing and the extensions 43—43 fit and slide within the recesses 30 and 31 of the same casing, the circular sections 41 being accommodated between the three arms 32, 33 and 34. The intermediate followers C and D are preferably made in the form of castings and will be suitably cored to lessen their weight as indicated by the dotted lines of Figure 2.

The four springs E and F, which are arranged in twin sets with the sets in tandem formation, are of like construction, each preferably consisting of an outer heavy coil and an inner lighter coil.

In assembling the device, the two springs E are inserted within the pockets of the casing A and then the intermediate follower C is applied to slide within the casing A, as best illustrated in Figure 2. Similarly, the springs F are assembled in the casing B and the intermediate follower D applied to that casing. The two units thus individually assembled are assembled with each other by turning one unit 180° with respect to the other so that the three arms of the casing A will slide and telescope with respect to the three arms of the other casing B, as best shown in Figure 1. When so assembled, it is evident that relative movement between the casings and intermediate followers in any direction in a vertical plane is prevented, but the two casings are adapted to move relatively longitudinally to further telescope.

In operation, assuming a compression stroke of the mechanism under a buffing action, the rear casing B remains stationary against the main follower 18 and the front intermediate follower C will also be held stationary. As the front main follower 17 is moved rearwardly, the front casing A is similarly moved and carries with it the rear intermediate follower D, thus effecting simultaneous or tandem compression of the front and rear twin sets of springs. In actual practice, the length of the recesses and arms of the telescoping portions of the casings A and B will be made such that the intermediate follower C and the intermediate follower D will simultaneously engage the limiting stop shoulder portions 140 of the respective casings A and B at the end of the permissible compression stroke of the mechanism, so as to prevent over-compression of the springs. It will also be observed that, with this construction, a very strong and substantial column is provided at the end of the compression stroke for transmitting the ultimate blow to the stop lugs and draft sills.

By employing three arms on each casing to engage the corresponding remote intermediate follower, and disposing the three arms as hereinbefore described, the load is applied to the intermediate followers at three spaced points in such manner that tendency of the intermediate followers to be tilted or cocked about either a horizontal line or a vertical line, in the event of eccentric blows being applied, is eliminated and a smooth, sliding of the intermediate followers without danger of binding or cocking within the casings is thus insured.

The arrangement shown and described is exceedingly simple and economical to manufacture and assemble; consists of very few parts; provides high shock absorbing capacity; and great column strength in absorbing the ultimate blows.

I have herein shown and described what I now consider the preferred manner of carrying out the invention, but the same is merely illustrative and I contemplate all changes and modifications that come within the scope of the claims appended hereto.

I claim:

1. In a twin tandem shock absorbing mechanism, the combination with two alined and relatively longitudinally movable casings each having longitudinally extending, twin arranged pockets therein; of tandem arranged twin sets of shock absorbing units within said pockets of the casings; and centrally disposed front and rear intermediate followers between said shock absorbing units and freely separable from said casings, the inner ends of the casings being recessed to thereby provide a plurality of spaced, longitudinally extending arms, the arms of one casing sliding within the recesses of the other casing, said arms engaging the intermediate followers remote from the respective casings from which the arms extend and said intermediate followers being also slidable within said recesses of the casings.

2. In a twin tandem shock absorbing mechanism, the combination with two alined and relatively longitudinally movable casings, each of said casings, at its inner end, having three spaced arms projecting longitudinally therefrom, said arms of the two casings being alternated and telescoping with respect to each other, each of said casings having also twin arranged pockets therein; of tandem arranged, twin sets of shock absorbing units within said pockets; and centrally located front and rear intermediate followers, said intermediate followers being engaged by the ends of the free arms of the respective casings, and slidable with respect to the other respective casings.

3. In a twin tandem draft gear, the combination with front and rear main followers; of alined, partially telescoped casings interposed between said followers, each of said casings having twin arranged spring receiving pockets; tandem arranged twin sets of springs, one set within each casing and bearing at their outer ends upon the respective main followers; and two intermediate followers separately formed with respect to the casings, one intermediate follower engaging the inner ends of the twin set of springs in one casing and adapted to be directly actuated by the other casing, the other intermediate follower engaging the inner ends of the other twin set of springs and adapted to be directly actuated by the remaining casing, each intermediate follower being slidable with respect to that casing within which is disposed the twin set of springs in contact therewith, each casing having three spaced arms at its inner end engaging with the corresponding intermediate follower at three spaced points.

In witness that I claim the foregoing I have hereunto subscribed my name this 30th day of July, 1924.

HARVEY J. LOUNSBURY.